Dec. 19, 1933.  A. P. DIEMAN  1,940,208
FILTER
Filed Feb. 18, 1932   2 Sheets-Sheet 1
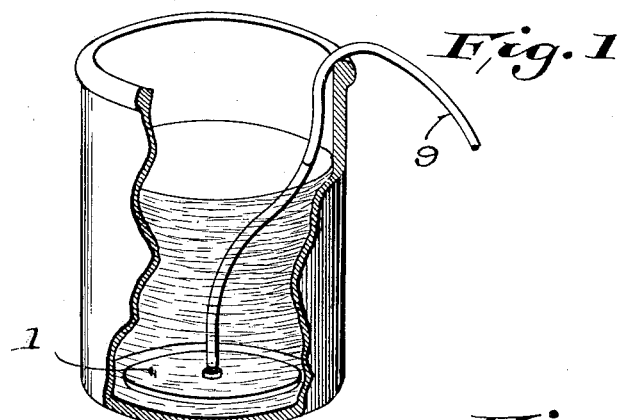
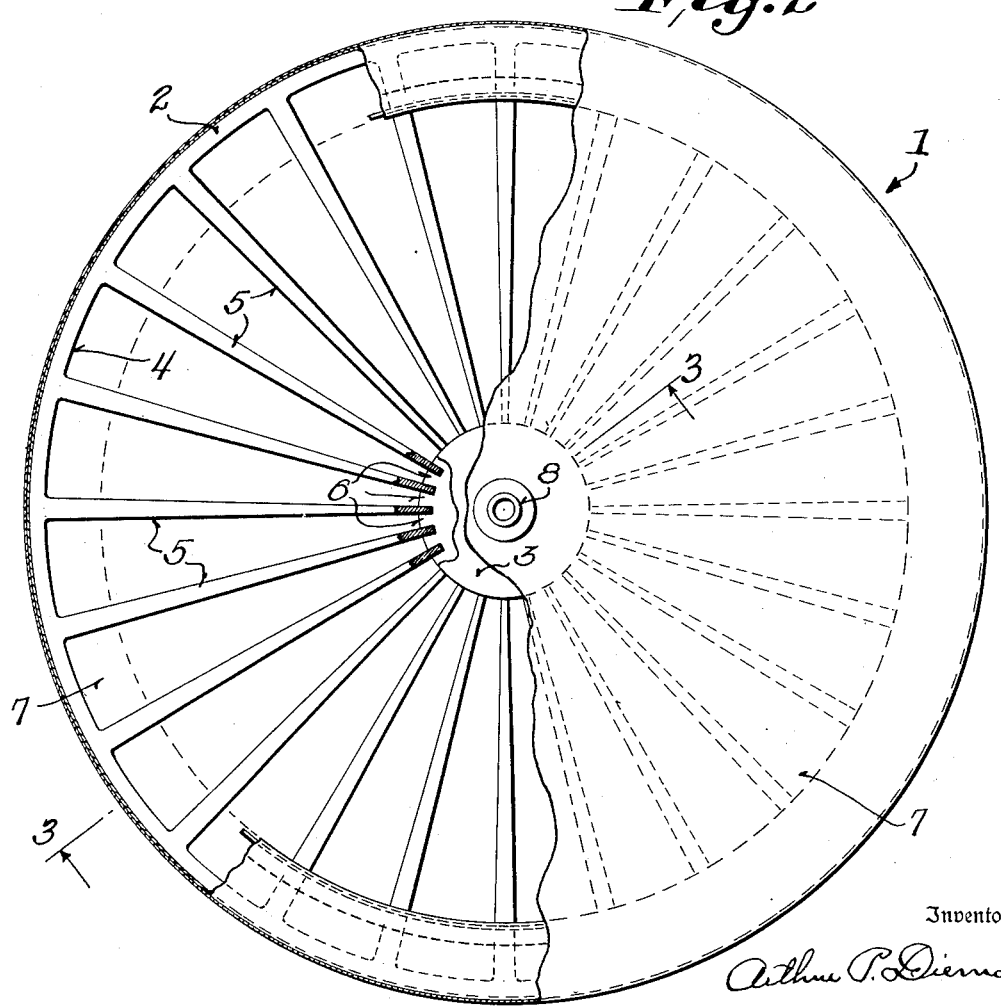
Inventor
Arthur P. Dieman
By Dec. 19, 1933. A. P. DIEMAN 1,940,208
FILTER
Filed Feb. 18, 1932 2 Sheets-Sheet 2
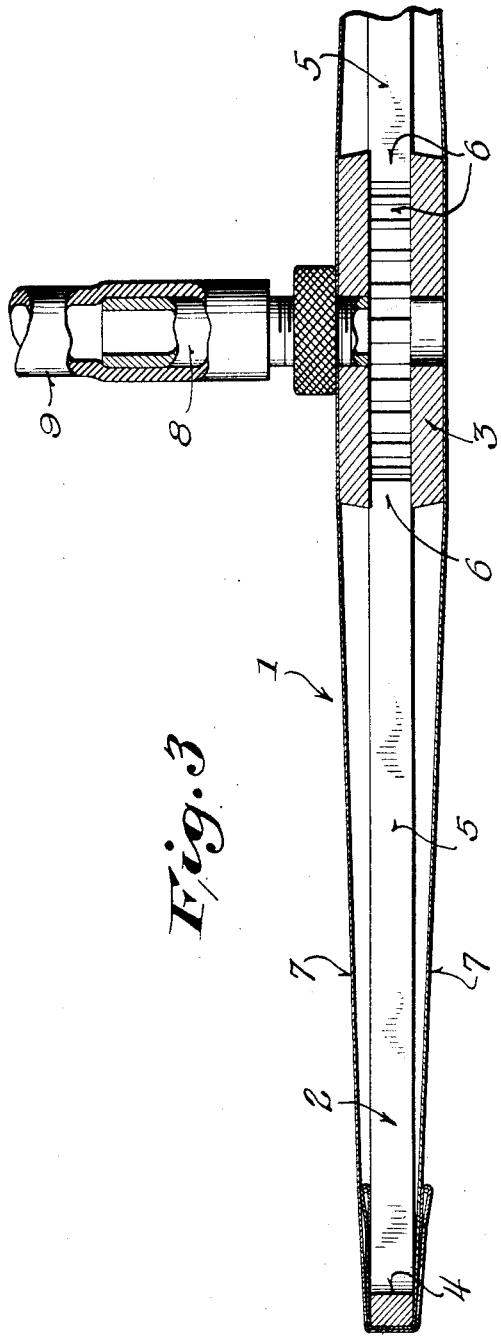
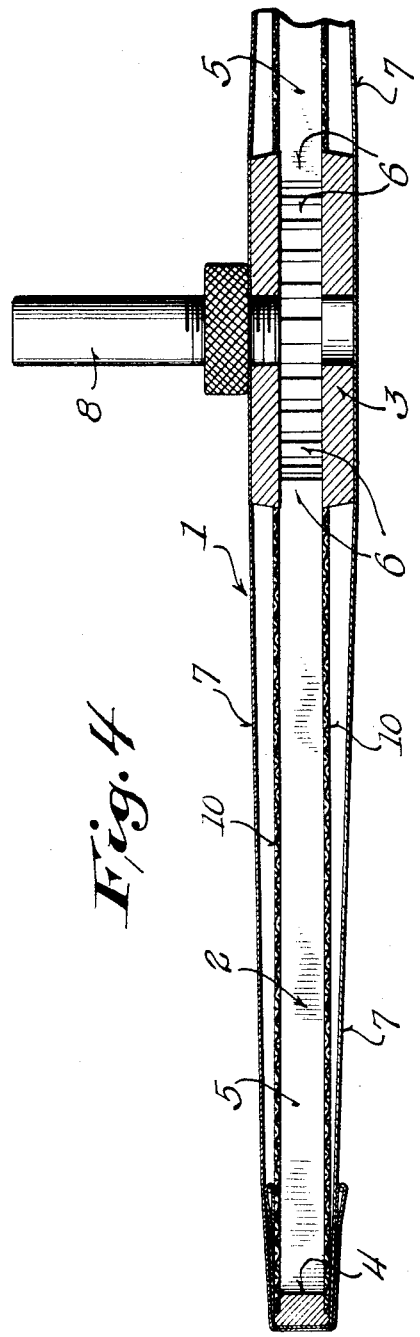
Inventor
Arthur P. Dieman Patented Dec. 19, 1933

1,940,208

UNITED STATES PATENT OFFICE 1,940,208

FILTER

Arthur P. Dieman, Milwaukee, Wis.

Application February 18, 1932. Serial No. 593,803

5 Claims. (Cl. 210—94)

This invention relates to filters of a type through which the liquid, to be filtered, is drawn preferably by gravity although a suction pump may be used if desired.

Heretofore in the home manufacture of soft drinks it has been impossible to remove liquid or beverage from its container, in a clarified condition, without the use of an expensive and bulky filter, whose cost is prohibitive to the average household.

One objective of this invention is to provide an efficient and inexpensive filter for household or small establishment use.

Another object of this invention is to provide a filter which may be readily cleaned.

In the drawings:

Figure 1 is a perspective view showing the filter in use.

Figure 2 is a detailed and enlarged view of the filter with parts broken away and in section to more clearly illustrate.

Figure 3 is an enlarged section taken on line 3—3 of Figure 2.

Figure 4 is a view similar to Figure 3 showing another form of my invention.

Referring by character to the drawings:

The filter 1 comprises a grid 2 having a hollow central portion 3 connected to a rim 4 by spokes or radially extending ribs 5. The central portion 3 is provided with openings 6 between the spokes or radially extended ribs. The entire grid is covered with a filtering material 7 such as fabric or any other material that is suitable for filtering purposes. The central portion is drilled and provided with a nipple 8 to which a hose 9 is attached. It will here be noted that when the filter is submersed and a gravity suction applied to it through the hose that the maximum flow of liquid through the hose will be assured, due to proportionately large expanse of filtering material through which the liquid must pass.

While I have shown the fabric or filtering material as composed of two pieces, which are secured to the grid by rubber bands stitched in around their edges, it is obvious that any manner of securing the fabric to the grid may be used without departing from my invention.

It will be noted that the central portion or hub 3 is thicker in cross section than the rim 4, allowing the bottom portion of the filtering material to be spaced from the bottom of the container, thereby allowing the liquid to pass through the bottom as well as the top of the filter. Another form of my invention as shown in Figure 4 provides a screen 10 positioned between the ribs and the filtering material, to keep the filtering material from collapsing when subjected to a power produced suction.

I claim:

1. A filter comprising a grid having a hollow hub provided with an axial bore, a covering of filtering material completely enclosing said grid having an opening therein registering with the bore, and an outlet tube connected with said bore and passing through the opening in said filter cloth, and means carried by the tube for holding the central portion of the filter material to the hub.

2. A filter comprising a grid, a pair of cloths formed of filtering material disposed on opposite sides of the grid with their edges arranged in overlapping relation and passing over opposite sides of the grid, and means carried by said edges for holding the filtering cloths on said grid.

3. A filter comprising an annular grid having a hollow hub, an annular rim and spokes connecting the rim and hub together, a pair of like filtering cloths arranged on opposite sides of the grid with their edges arranged in overlapping relation and disposed on opposite sides of the grid, elastic carried by the edges of said filtering cloths for holding the cloths in position, and an outlet tube extending through one of said cloths and anchored to and communicating with the interior of the hub.

4. A filter comprising a grid having a hollow hub, an annular rim and arms connecting the hub and rim together, filtering cloths arranged on opposite sides of the grid, means holding the filtering cloths in position on the grid, an outlet tube communicating with the interior of the hub and carried by said hub and passing through one of said filtering cloths, and an extension formed on the hub opposite to the filtering tube for spacing the major portion of the grid from the bottom of a receptacle.

5. A filter comprising a grid having a hollow hub, a covering of filtering material completely enclosing said grid, an outlet tube anchored to and communicating with the interior of the hub, and an extension formed on the hub opposite to the filtering tube for spacing the major portion of the grid from the bottom of a receptacle.

ARTHUR P. DIEMAN.